United States Patent [19]

Furukawa et al.

[11] Patent Number: 5,102,871
[45] Date of Patent: Apr. 7, 1992

[54] NUTRIENT COMPOSITION

[75] Inventors: Tadayasu Furukawa, Chesterfield, Mo.; Takahiro Hara, Machida, Japan

[73] Assignee: Kyowa Hakko Kogyo Co., Ltd., Tokyo, Japan

[21] Appl. No.: 510,876

[22] Filed: Apr. 18, 1990

[30] Foreign Application Priority Data

Apr. 24, 1989 [JP] Japan ................................ 64-104261
Dec. 22, 1989 [JP] Japan ................................ 64-334483

[51] Int. Cl.$^5$ ...................... A61K 37/02; C07K 5/06; C07K 5/08
[52] U.S. Cl. ........................................ 514/11; 530/331
[58] Field of Search ...................... 514/19, 18; 530/331

[56] References Cited

U.S. PATENT DOCUMENTS

| 4,710,489 | 12/1987 | Meister | 530/331 |
| 4,801,579 | 1/1989 | Rainer et al. | 514/19 |
| 4,927,808 | 5/1990 | Kitahara | 514/19 |

FOREIGN PATENT DOCUMENTS

| 0259167 | 3/1988 | European Pat. Off. |
| 0264953 | 4/1988 | European Pat. Off. |
| 3206810 | 2/1982 | Fed. Rep. of Germany |

OTHER PUBLICATIONS

Patent Abstracts of Japan, vol. 11, No. 202.
Patent Abstracts of Japan, vol. 5, No. 148.
Patent Abstracts of Japan, vol. 11, No. 381.
Patents Abstracts of Japan, vol. 7, No. 285.
Institute for Biological Chemistry and Nutrition, Stehle, et al (1985) pp. 116-123, "The Potential Use of Short Chain Peptides in Parenteral Nutrition".
Utilization of Glutathione Disulfide as Cysteine Source During Long-Term Parenteral Nutrition in the Growing Rat, Neuhauser-Berhold, et al, Metabolism, vol. 37, No. 8, pp. 796–801.
Proteins and Amino Acids "In Vivo Utilization of Cystine Containing Synthetic Short-Chain Peptides After Intra-Venous Bolus Injection in the Rat", Stehl, et al; (1988) pp. 1470–1474.

Primary Examiner—Lester L. Lee
Assistant Examiner—S. G. Marshall
Attorney, Agent, or Firm—Antonelli, Terry Stout & Kraus

[57] ABSTRACT

Nutrient compositions useful as amino acid infusions comprise L-glutamyl-L-cystine and/or L-glutamyl-L-cysteine disulfide. The nutrient compositions can achieve extremely high utilization of cysteine and cystine which could not be hitherto used as nutrient compositions.

4 Claims, 4 Drawing Sheets

NUTRIENT COMPOSITION

BACKGROUND OF THE INVENTION

The present invention relates to nutrient compositions for mammals such as infusions and sports drink and more particularly to nutrient compositions comprising L-glutamyl-L-cystine (hereinafter referred to as Glu-Cys-Cys) and/or L-glutamyl-L-cysteine disulfide [hereinafter referred to as (Glu-Cys)₂].

L-cysteine (hereinafter referred to as cysteine) is not considered to be an essential amino acid since cysteine is synthesized from L-methionine (hereinafter referred to as methionine) in a living body. Therefore, nutrient supplementation of sulfur-containing amino acids such as cysteine has been made using methionine. In recent years, however, it has been revealed that conversion of methionine into cysteine is not sufficiently made in bodies of newborns and patients with hepatic cirrhosis, homocystinemia, etc. It has thus been pointed out that for nutrient supplementation of sulfur-containing amino acids, it is necessary to supplement not only methionine but also cysteine [Metabolism, 37, No. 8, 796 (1988)].

It has further been revealed that demand for sulfur-containing amino acids increases after immoderate exercise or upon drinking and effectiveness of administration of cysteine or L-glutathione (γ-L-glutamyl-L-cysteinyl-glycine, hereinafter referred to as glutathione) which has a cysteine residue has been recognized.

Cysteine is unstable in solution, so that it is difficult to add cysteine directly to a liquid nutrient composition such as an infusion. Use of N-acetyl-L-cysteine in place of cysteine has been studied and has been partly put into practice. However, it has been pointed out that there is a problem in its stability. Furthermore, glutathione having a cysteine residue is more stable than cysteine, but the problem remains unsolved when it is sterilized with heating. On the other hand, L-cystine (hereinafter referred to as cystine) is considered to be equivalent to cysteine from a nutriological standpoint, and it is extremely stable as the oxidized form of cysteine. However, because of low solubility in water (less than 0.11 g/l at 25° C.), cystine cannot be used in an infusion, etc. Recently, glutathione disulfide having a cystine residue (oxidized form of glutathione) has been examined for this purpose but has not been provided for practical use yet.

As a method for improving the stability of cysteine, there is known a method in which cysteine is acetylated as described above. The method has been partly used practically in the prescription of infusion. With respect to cystine considered to be equivalent to cysteine from a nutriological standpoint, methods for improving the solubility by using glutathione disulfide having a cystine residue and by converting cystine into a peptide have been studied. As nutrient compositions containing cystine-containing peptides, there are known a composition comprising N,N'-bis-α-aspartyl-L-cystine [hereinafter referred to as (Asp-Cys)₂] (Japanese Published Unexamined Patent Application No. 151156/87), a composition comprising N²-cysteinyl-N⁶-L-cysteinyl-L-lysine [hereinafter referred to as Cys-Lys(Cys)] (DE 3206810), a composition comprising compounds represented by (X-Cys)₂ (wherein X is Gly, Ala, Leu, Ile or Phe) (EP 264953), a composition comprising bis(acetylglycyl)-L,L-cystine (Japanese Published Unexamined Patent Application No. 233999/88), and the like. Further, there are a report on the solubility of L-cysteinyl-bis-L-alanine [hereinafter referred to as (Cys-Ala)₂] in Clin. Nutr., Spec. Suppl. 4, 116-123 (1985) and a report on the behavior of bis-α-L-alanyl-L-cystine [hereinafter referred to as (Ala-Cys)₂] and bis-glycyl-L-cystine [hereinafter referred to as (Gly-Cys)₂)] in blood in J. Nutrition 118, 1470 (1988).

It has been desired to develop a technique for supplying unstable cysteine or cystine which is nutriologically equivalent to cysteine as nutrient compositions in a liquid form prepared by sterilization with heating.

SUMMARY OF THE INVENTION

The present invention provides non-cysteine containing nutrient compositions for introducing cysteine into an in vivo system comprising Glu-Cys-Cys and/or (Glu-Cys)₂ in an amount sufficient to increase the level of cysteine in said system. By the nutrient compositions, cysteine or cystine which could not be contained in liquid nutrient compositions prepared by sterilization with heating can be supplied as nutrient components.

The present invention also provides a method for introducing cysteine into an in vivo system by administering the above peptide(s) orally, parenterally or intra-intestinally.

DETAILED DESCRIPTION OF THE INVENTION

Figure 1:
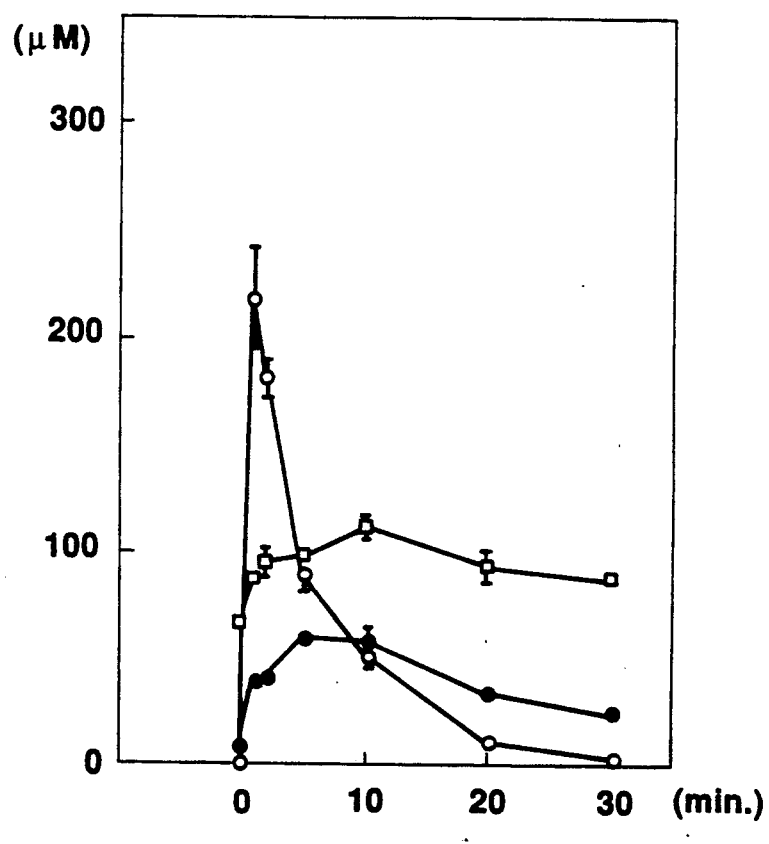
FIG. 1 shows changes in the concentrations of γ-Glu-Cys-Cys and its constituent amino acids in blood with the passage of time after injection of γ-Glu-Cys-Cys to mice. The symbols ○—○, □—□ and ●—● refer to γ-Glu-Cys-Cys, glutamic acid and cystine, respectively.
Figure 2:
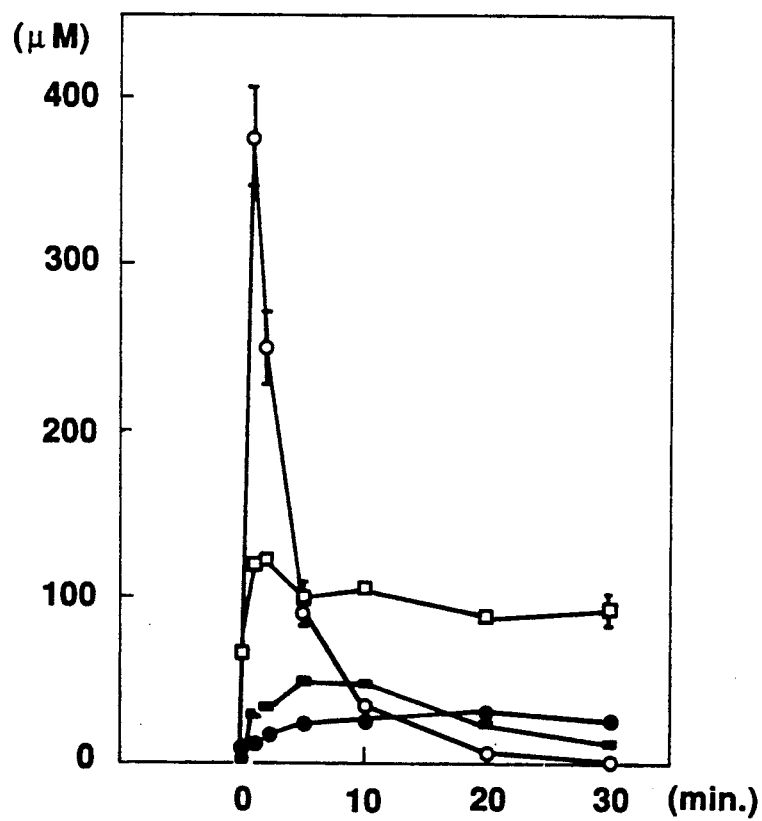
FIG. 2 shows changes in the concentrations of (γ-Glu-Cys)₂, γ-Glu-Cys-Cys and its constitutent amino acids in blood with the passage of time after injection of (γ-Glu-Cys)₂ to mice. The symbols ○—○, ■—■, □—□ and ●—● refer to (γ-Glu-Cys)₂, γ-Glu-Cys-Cys, glutamic acid and cystine, respectively.
Figure 3:
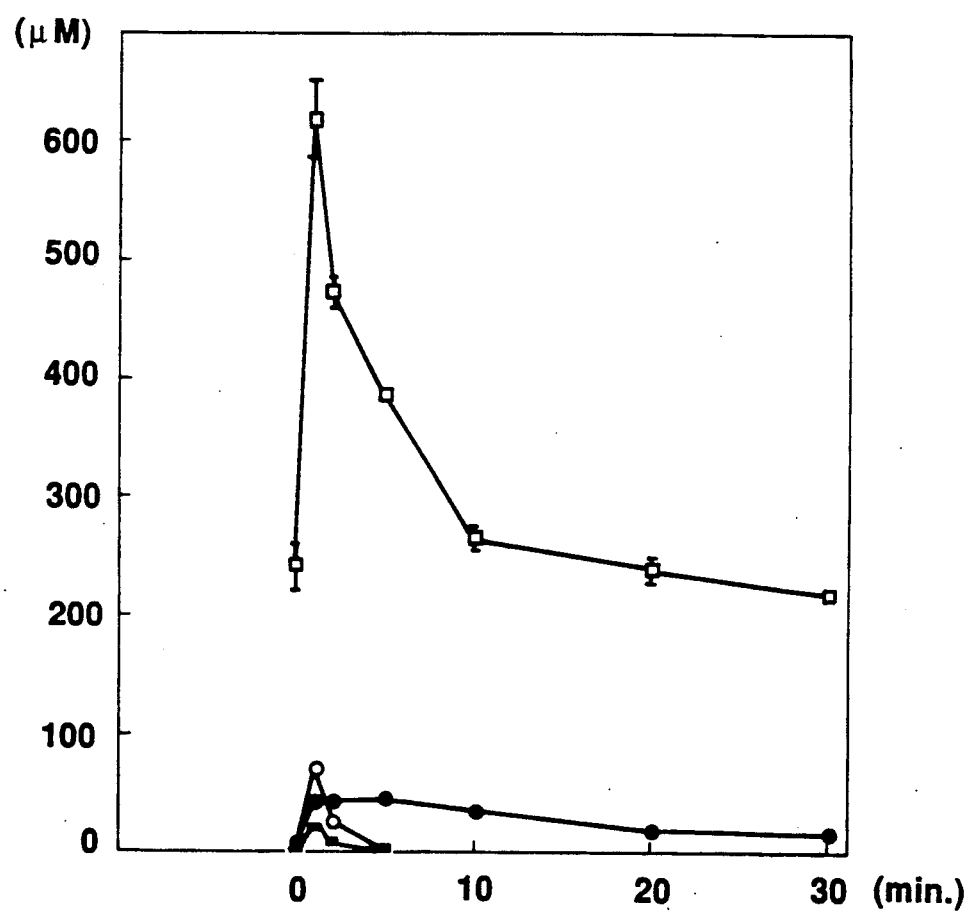
FIG. 3 shows changes in the concentrations of (Ala-Cys)₂, alanylcystine [hereinafter referred to as Ala-(Cys)₂] and its constituent amino acids in blood with the passage of time after injection of (Ala-Cys)₂ to mice. The symbols ○—○, ■—■, □—□ and ●—● refer to (Ala-Cys)₂, Ala-(Cys)₂, alanine and cystine, respectively.
Figure 4:
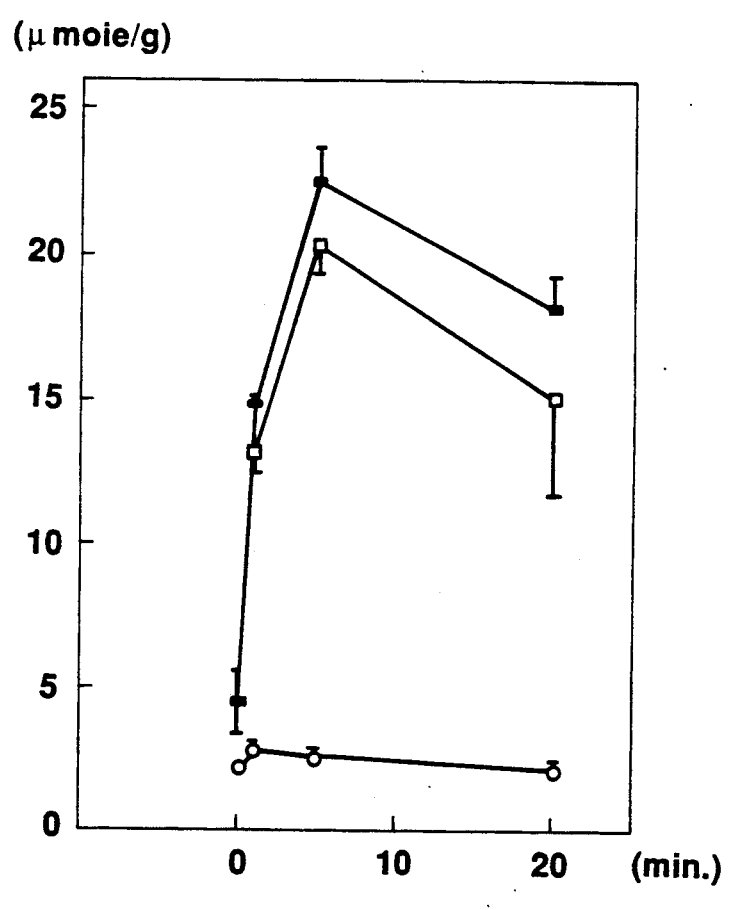
FIG. 4 shows changes in the concentrations of glutamic acid and alanine in kidney with the passage of time after injection of γ-Glu-Cys-Cys, (γ-Glu-Cys)₂ and (Ala-Cys)₂ to mice. The symbols □—□, ■—■ and ○—○ refer to glutamic acid derived from γ-Glu-Cys-Cys, glutamic acid derived from (γ-Glu-Cys)₂ and alanine derived from (Ala-Cys)₂, respectively.

The present invention is described in detail below.

Glu-Cys-Cys and (Glu-Cys)₂ are classified into two types, α and γ. Both types can be used in the present invention, but type γ is preferably used.

Glu-Cys-Cys and (Glu-Cys)₂ can be prepared according to the methods described in Methods in Enzymology, 113, 555-564 (1985).

The peptides are usually used in the form of solution, paste, powder, etc. with other components such as amino acids and nutrients, but may be used as a solution without other components.

Glu-Cys-Cys and (Glu-Cys)₂ may be added singly or as a mixture. The nutrient composition may contain either of these compounds or a mixture thereof in an amount of 0.0005 to 30 wt. %.

Examples of the nutrient compositions which are nutriologically preferred for supplementing cystine or cysteine include solutions of Glu-Cys-Cys and/or (Glu-Cys)$_2$ in water, physiological saline or buffer solutions as well as compositions containing Glu-Cys-Cys and/or (Glu-Cys)$_2$ together with amino acids or protein hydrolyzates (peptides), nutrient additives described below, etc., such as amino acid infusions, nutrient preparations for oral nutrient supplementation, and jelly-like nutrient preparations.

In the case of oral or intra-intestinal administration, nutrient additives such as readily digestible carbohydrates, fats, vitamins and minerals may be added to the compositions to adjust the nutrient balance. Further, tasting agents such as pseudo-tasting agents, sweeteners, flavors and dyes, flavoring agents, appearance-improving agents, etc. may also be added to improve flavor of the compositions for oral administration. Specific examples of the nutrient additives include starch, dextrin, glucose, maltose, lactose, skimmed milk, egg yolk powder, egg yolk oil, malt extract, medium chain fatty acid, vitamin A, thiamine, riboflavin, pyridoxine, niacin, pantothenic acid, cyanocobalamin, L-ascorbic acid, α-tocopherol, sodium chloride, potassium chloride, calcium chloride, and iron lactate.

The components described above are blended, mixed with water and dispersed, and the resulting composition as drink or paste is sealed in a moistureproof bag, bottle, can, etc. and then sterilized with heating for storage, distribution and use. Alternatively, the components may be well mixed in a powdery state and the powdery composition may be mixed with water and dispersed during storage or distribution or just before use. Glu-Cys-Cys and (Glu-Cys)$_2$ can be freely subjected to treatments such as cooking with heating and sterilization since they are highly stable to heat and stable in solution over long periods of time.

The amino acid infusions comprising Glu-Cys-Cys and/or (Glu-Cys)$_2$ have the following composition, for example, wherein unit is mg/dl.

| | |
|---|---|
| L-Isoleucine | 160–1070 |
| L-Leucine | 180–1720 |
| L-Lysine hydrochloride | 180–2400 |
| L-Phenylalanine | 130–1400 |
| L-Methionine | 50–1200 |
| L-Threonine | 80–720 |
| L-Tryptophan | 30–350 |
| L-Valine | 70–1130 |
| L-Arginine hydrochloride | 120–1500 |
| L-Histidine hydrochloride | 50–900 |
| Glycine | 200–2500 |
| L-Alanine | 70–1130 |
| Sodium L-aspartate | 0–1300 |
| Sodium L-glutamate | 0–1300 |
| Glu—Cys—Cys and/or (Glu—Cys)$_2$ | 1–7000 |
| L-Proline | 90–1080 |
| L-Serine | 60–1200 |
| L-Tyrosine | 3–90 |

The amino acid infusions of the present invention can be obtained from the amino acid compositions described above by a conventional method for preparing an amino acid infusion, for example, according to the method shown in Example 1 below.

It was confirmed that Glu-Cys-Cys and (Glu-Cys)$_2$ have extremely high solubility compared with cystine, as shown in Comparative Example 1 given below, and are extremely stable even upon sterilization with heating or during storage over long periods of time in the form of nutrient composition. For example, these substances were hardly decomposed in a concentration of 10 mM at pH 6.5 by heat treatment at 110° C. for 20 minutes. Furthermore, these substances were not decomposed in a concentration of 10 mM at pH 6.5 on standing at 40° C. for 60 days.

COMPARATIVE EXAMPLE 1

The solubility of γ-Glu-Cys-Cys and (γ-Glu-Cys)$_2$ was compared with that of cystine and known cystine-containing peptides. It was confirmed that the solubility of γ-Glu-Cys-Cys and (γ-Glu-Cys)$_2$ was markedly improved compared with cystine.

TABLE 1

| | Solubility in 1000 ml of water (g) |
|---|---|
| γ-Glu—Cys—Cys | >70 |
| (γ-Glu—Cys)$_2$ | >70 |
| Cys—Lys(Cys) | >50 |
| (Asp—Cys)$_2$ | >50 |
| (Gly—Cys)$_2$ | >50 |
| (Ala—Cys)$_2$ | >50 |
| (Cys—Ala)$_2$ | 8.1 |
| Cystine | 0.1 |
| | (pH 6.5, 25° C.) |

γ-Glu-Cys-Cys and (γ-Glu-Cys)$_2$ are naturally occurring peptides, and therefore, are efficiently utilized in vivo. In fact, it is reported that when the compounds are independently administered subcutaneously to mice, they can be utilized in the synthesis of kidney glutathione [M. E. Anderson and A. Meister, Proc. Natl. Acad. Sci., USA, vol. 80, pp. 707 (1983)]. In addition, it is assumed that γ-Glu-Cys-Cys and (γ-Glu-Cys)$_2$ would be substrates for γ-glutamyltransferase in vivo and could be effectively utilized in vivo.

Hydrolysis of γ-Glu-Cys-Cys and (γ-Glu-Cys)$_2$ by γ-glutamyltransferase, in vitro hydrolysis of them in human and mouse plasma, and disappearance from blood and uptake by kidney of them following injection are described below by referring to Comparative Examples 2 to 6.

COMPARATIVE EXAMPLE 2

Hydrolysis of γ-Glu-Cys-Cys and (γ-Glu-Cys)$_2$ by γ-glutamyltransferase was compared with that of (Asp-Cys)$_2$, (Gly-Cys)$_2$ and (Ala-Cys)$_2$, according to the test method described below. The former two compounds used in the present invention were almost completely hydrolyzed, whereas the latter three known compounds were not hydrolyzed. It was thus recognized that there was a difference between these peptides with respect to utilization in vivo.

Test Method

A peptide was dissolved in Tris-hydrochloride buffer solution (pH 7) in a concentration of 5 mM and γ-glutamyltransferase prepared from swine kidney was added to the solution. After reaction at 37° C. for 120 minutes, the amount of the remaining peptide was determined.

COMPARATIVE EXAMPLE 3

In vitro hydrolysis of γ-Glu-Cys-Cys and (γ-Glu-Cys)$_2$ in human plasma was compared with that of known cystine-containing peptides shown in Table 2 according to the test method described below. As shown in Table 2, the former two compounds used in the present invention were hydrolyzed in plasma only with difficulty in contrast to the latter three known compounds. It was thus recognized that there was a clear difference between these peptides with respect to utilization in vivo.

Test Method

To 100 μl of plasma collected and prepared from human was added 10 μl of a 24 mM solution of a peptide in physiological saline. After reaction at 37° C. for 30 minutes, the amount of the remaining peptide was determined.

TABLE 2

|  | Residual amount in plasma (%) |
|---|---|
| γ-Glu—Cys—Cys | 67 |
| (γ-Glu—Cys)$_2$ | 85 |
| (Asp—Cys)$_2$ | 30 |
| (Gly—Cys)$_2$ | 35 |

(Ala—Cys)$_2$ disappeared from blood extremely rapidly after administration and at the same time, rapid release of alanine into blood was observed. On the other hand, in the groups which received γ-Glu-Cys-Cys and (γ-Glu-Cys)$_2$ respectively, decrease in amount of the peptides and increase in amount of glutamic acid were moderate. It was thus recognized that there was a great difference in disappearance of the piptides from blood.

Test Method

Physiological saline solutions of γ-Glu-Cys-Cys, (γ-Glu-Cys)$_2$ and (Ala-Cys)$_2$ were injected respectively to groups of C3H/He mice (6 weeks of age, male, weighing 22 g) through the tail vein in a dose of 250 μmoles/kg body weight, and then blood was collected during 30 minutes. Changes in the concentrations of the peptides and their constituent amino acids in blood with the passage of time were determined. Five mice were used for one test group, and the results are shown by the mean±SEM in Table 4.

TABLE 4

| Concentration in blood | Unit: μM Time after injection of peptide (min) | | | | | | |
|---|---|---|---|---|---|---|---|
|  | 0 | 1 | 2 | 5 | 10 | 20 | 30 |
| GCC | 0 | 217.8 ± 19.7 | 190.0 ± 9.3 | 88.7 ± 6.7 | 50.5 ± 5.7 | 10.5 ± 3.7 | 2.8 ± 1.8 |
| Glu | 64.5 ± 1.7 | 86.2 ± 2.7 | 94.0 ± 7.6 | 97.2 ± 4.1 | 110.4 ± 5.7 | 93.4 ± 7.4 | 86.9 ± 6.2 |
| CysCys | 6.84 ± 1.6 | 37.8 ± 2.3 | 39.0 ± 2.0 | 58.5 ± 2.9 | 56.9 ± 5.3 | 34.0 ± 1.0 | 24.3 ± 1.6 |
| GCCG | 0 | 376.7 ± 30.1 | 249.9 ± 22.5 | 90.6 ± 9.9 | 32.3 ± 2.1 | 5.3 ± 0.5 | 0 |
| GCC | 0 | 26.8 ± 1.8 | 31.5 ± 2.4 | 46.4 ± 2.1 | 46.0 ± 2.3 | 21.1 ± 1.2 | 9.0 ± 0.4 |
| Glu | 64.5 ± 1.7 | 118.8 ± 1.3 | 121.8 ± 10.1 | 99.0 ± 6.1 | 104.5 ± 1.1 | 87.5 ± 4.9 | 90.7 ± 8.6 |
| CysCys | 6.84 ± 1.6 | 10.5 ± 0.3 | 13.1 ± 2.3 | 23.1 ± 0.9 | 27.9 ± 1.3 | 30.1 ± 1.2 | 23.6 ± 0.6 |
| ACCA | 0 | 70.1 ± 5.7 | 24.9 ± 10.8 | 0 | 0 | 0 | 0 |
| ACC | 0 | 18.0 ± 1.4 | 5.7 ± 2.3 | 0 | 0 | 0 | 0 |
| Ala | 241.6 ± 19.7 | 615.9 ± 31.4 | 471.1 ± 11.9 | 387.6 ± 5.8 | 267.1 ± 9.3 | 240.3 ± 11.6 | 220.4 ± 0.1 |
| CysCys | 6.84 ± 1.6 | 42.6 ± 3.1 | 43.4 ± 7.1 | 44.8 ± 4.0 | 35.1 ± 1.2 | 19.6 ± 1.5 | 18.4 ± 1.5 |

GCC: γ-Glu—Cys—Cys
GCCG: (γ-Glu—Cys)$_2$
ACCA: (Ala—Cys)$_2$
ACC: Ala—(Cys)$_2$

| (Ala—Cys)$_2$ | 26 |
|---|---|

COMPARATIVE EXAMPLE 4

In vitro hydrolysis of γ-Glu-Cys-Cys and (γ-Glu-Cys)$_2$ in mouse plasma was compared with that of (Ala-Cys)$_2$ according to the test method described below. As shown in Table 3, the former two compounds used in the present invention were hydrolyzed in plasma only with difficulty in contrast to (Ala-Cys)$_2$.

Test Method

To 50 μl of plasma collected and prepared from C3H/He mouse (6 weeks of age, male, weighing 22 g) was added 5 μl of a 27.1 mM solution of a peptide in physiological saline, followed by reaction at 37° C. for 30 minutes. Five mice were used for one test group, and the results are expressed by the mean value.

TABLE 3

|  | Residual amount in plasma (%) |
|---|---|
| γ-Glu—Cys—Cys | 53 |
| (γ-Glu—Cys)$_2$ | 84 |
| (Ala—Cys)$_2$ | 0 |

COMPARATIVE EXAMPLE 5

Disappearance of γ-Glu-Cys-Cys and (γ-Glu-Cys)$_2$ from mouse blood was compared with that of (Ala-Cys)$_2$ according to the test method described below.

COMPARATIVE EXAMPLE 6

Uptake of γ-Glu-Cys-Cys and (γ-Glu-Cys)$_2$ by mouse kidney was compared with that of (Ala-Cys)$_2$ according to the test method described below.

In the groups which received γ-Glu-Cys-Cys and (γ-Glu-Cys)$_2$ respectively, the concentration of glutamic acid was significantly high, and this suggests uptake of the peptides by the kidney and effective utilization thereof. On the other hand, cystine was not detected in the kidney for any of the peptides tested.

Test Method

Physiological saline solutions of γ-Glu-Cys-Cys, (γ-Glu-Cys)$_2$ and (Ala-Cys)$_2$ were administered respectively to groups of C3H/He mice (6 weeks of age, male, weighing 22 g) through the tail vein in a dose of 250 μmoles/kg body weight, and the kidney was excised 1, 5 and 20 minutes after the administration, followed by determination of glutamic acid, alanine and cystine in the kidney. Five mice were used for one test group, and the results are shown by the mean±SEM in Table 5.

TABLE 5

|  | Unit: μmole/g wet weight of kidney | | | |
|---|---|---|---|---|
|  | Time after administration of peptide (min) | | | |
|  | 0 | 1 | 5 | 20 |
| Glu (GCC) | 5.54 ± 0.33 | 13.09 ± 0.23 | 20.32 ± 1.18 | 15.1 ± 1.23 |

TABLE 5-continued

| | Unit: μmole/g wet weight of kidney | | | |
|---|---|---|---|---|
| | Time after administration of peptide (min) | | | |
| | 0 | 1 | 5 | 20 |
| Glu (GCCG) | 5.54 ± 0.3 | 14.82 ± 0.75 | 22.5 ± 1.00 | 18.14 ± 3.37 |
| Ala (ACCA) | 2.33 ± 0.11 | 2.87 ± 0.18 | 2.59 ± 0.28 | 2.16 ± 0.31 |

As shown above, γ-Glu-Cys-Cys and (γ-Glu-Cys)$_2$ are hardly hydrolyzed in plasma compared with other cystine-containing peptides and are specifically hydrolyzed by γ-glutamyltransferase. γ-Glutamyltransferase is widely distributed in vital tissues of kidney, small intestine, liver, etc. When γ-Glu-Cys-Cys and/or (γ-Glu-Cys)$_2$ are administered in blood, they can be utilized in kidney, liver, etc. with little hydrolysis in blood, in contrast to known cystine-containing peptides. On the other hand, when γ-Glu-Cys-Cys and/or (γ-Glu-Cys)$_2$ are administered orally or intraintestinally, it is considered that they are hydrolyzed by γ-gluamyl-transferase in small intestine and effectively utilized through intestinal route. Moreover, it is considered that γ-Glu-Cys-Cys and (γ-Glu-Cys)$_2$ are also taken into cells as they are.

Certain embodiments of the invention are shown by the following representative examples.

EXAMPLE 1

To the amino acid composition described below was added 1 liter of distilled water for injection at about 70° C. to dissolve the components. The pH was adjusted to 6.5 with NaOH solution. The solution was filtered through a millipore filter and the filtrate was packed in glass bottles in 200 ml portions, followed by blowing of sterile nitrogen gas for 30 seconds. After sealing, the bottles were sterilized with heating at 110° C. for 60 minutes to prepare amino acid infusions.

| | |
|---|---|
| L-Isoleucine | 4.6 g |
| L-Leucine | 7.7 g |
| L-Lysine hydrochloride | 5.0 g |
| L-Phenylalanine | 4.3 g |
| L-Methionine | 2.1 g |
| L-Threonine | 2.9 g |
| L-Tryptophan | 1.0 g |
| L-Valine | 4.9 g |
| L-Arginine hydrochloride | 6.1 g |
| L-Histidine hydrochloride | 2.6 g |
| Glycine | 3.4 g |
| L-Alanine | 4.6 g |
| Sodium L-aspartate | 0.3 g |
| Sodium L-glutamate | 0.3 g |
| γ-Glu—Cys—Cys | 3.0 g |
| L-Proline | 3.9 g |
| L-Serine | 2.3 g |
| L-Tyrosine | 0.3 g |

EXAMPLE 2

To the amino acid composition described below was added 1 liter of distilled water for injection at about 70° C. to dissolve the components. The pH was adjusted to 6.5 with NaOH solution. The solution was filtered through a millipore filter and the filtrate was packed in glass bottles in 200 ml portions, followed by blowing of sterile nitrogen gas for 30 seconds. After sealing, the bottles were sterilized with heating at 110° C. for 60 minutes to prepare amino acid infusions.

| | |
|---|---|
| L-Isoleucine | 5.6 g |
| L-Leucine | 12.5 g |
| L-Lysine hydrochloride | 11.0 g |
| L-Phenylalanine | 9.5 g |
| L-Methionine | 3.7 g |
| L-Threonine | 6.5 g |
| L-Tryptophan | 1.0 g |
| L-Valine | 4.9 g |
| L-Arginine hydrochloride | 9.5 g |
| L-Histidine hydrochloride | 8.0 g |
| Glycine | 10.4 g |
| L-Alanine | 6.5 g |
| Sodium L-aspartate | 3.8 g |
| Sodium L-glutamate | 2.5 g |
| (γ-Glu—Cys)$_2$ | 3.0 g |
| L-Proline | 3.9 g |
| L-Serine | 2.3 g |
| L-Tyrosine | 0.3 g |

EXAMPLE 3

| | |
|---|---|
| Casein hydrolyzate | 10 g |
| Gelatine | 8 g |
| γ-Glu—Cys—Cys | 2.5 g |
| Dextrin | 20 g |
| Reduced maltose | 20 g |
| Water | 300 ml |

After the above composition was heated at 100° C. for 30 minutes and dispersed, the dispersion was cooled to give a jelly-like nutrient preparation. γ-Glu-Cys-Cys was stably maintained under the conditions for the treatment.

What is claimed is:

1. A method for the supplementation of cysteine in mammals which comprises administering L-glutamyl-L-cystine and/or L-glutamyl-L-cysteine disulfide in an amount effective to increase the in vivo level of cysteine in mammals.

2. The method according to claim 1, wherein said administration is made orally.

3. The method according to claim 1, wherein said L-glutamyl-L-cystine and/or L-glutamyl-L-cysteine disulfide is in the form of aqueous solution.

4. The method according to claim 3, wherein said solution further comprises several amino acids selected from the group consisting of L-isoleucine, L-leucine, L-lysine, L-phenylalanine, L-methionine, L-threonine, L-tryptophan, L-valine, L-arginine hydrochloride, L-histidine hydrochloride, glycine, L-alanine, sodium L-aspartate, sodium L-glutamate, L-proline, L-serine and L-tyrosine.

* * * * *